Dec. 29, 1964 A. D. GARRISON ETAL 3,163,761
RADIOLOGICAL WELL LOGGING USING NEUTRON COLLIMATOR
TO REDUCE THE EFFECT OF WELL FLUID ON THE LOG
Original Filed June 28, 1956
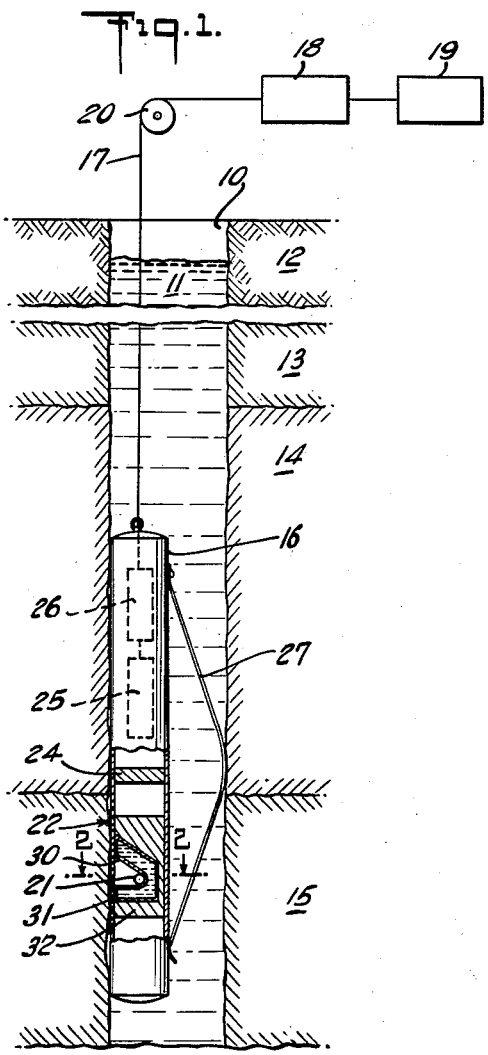
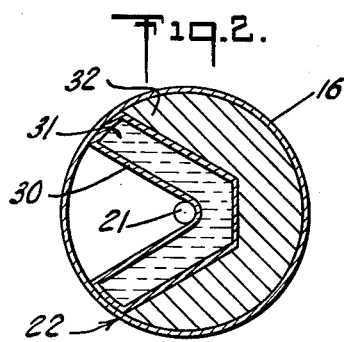
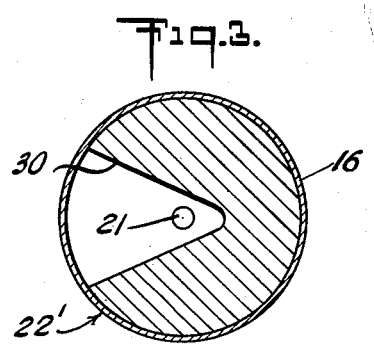

3,163,761
RADIOLOGICAL WELL LOGGING USING NEUTRON COLLIMATOR TO REDUCE THE EFFECT OF WELL FLUID ON THE LOG
Allen D. Garrison, La Jolla, Calif., and Elmer Eisner, Houston, Tex., assignors to Texaco Inc., New York, N.Y., a corporation of Delaware
Continuation of application Ser. No. 594,583, June 28, 1956. This application Oct. 29, 1962, Ser. No. 236,758
5 Claims. (Cl. 250—83.3)

The present invention relates generally to the logging of bore holes or wells through the earth by means of a source of radioactivity and a detector. More particularly, the invention relates to improvements in neutron logging in which a source of neutrons is employed to bombard the earth formations traversed by the bore hole and scattered or slow neutrons or gamma rays induced in the formations by neutron bombardment are measured in order to provide information as to the nature of the formations.

As is generally well known, there are two types of so-called "neutron" logging. In one method a source of neutrons and a detector of neutrons disposed within a logging instrument or housing are passed through the bore hole. Neutrons from the source pass outwardly into the formations around the hole and, depending upon the nature of the formation bombarded, more or less of the neutrons are scattered within the formation, some of the neutrons passing back into the hole to strike the detector. In the other method, a source of neutrons and a gamma ray detector disposed in a housing are passed through the bore hole and a measurement is made of the intensity of gamma rays induced in the formations by the neutron bombardment. For purposes of brevity, the first of these methods will be referred to as the neutron-neutron method, indicating that neutrons pass out into the formations and that neutrons come back into the hole and are measured. The second method will be referred to as the neutron-gamma method, indicating that neutrons pass outwardly into the formations to induce gamma rays therein, some of which gamma rays pass back into the hole to be detected.

One of the most serious difficulties in neutron-neutron and neutron-gamma ray logging is due to the influence of the fluids in the bore hole between the source of neutrons and the formations and between the source and detector. Fluid between the formation and detector is also of concern. The fluid normally contained within a bore hole is often hydrogenous oil or water or more frequently the drilling mud used in the drilling of the bore hole. The penetration of neutrons through the hydrogen-containing fluids of the bore hole is rather limited and as a result substantial changes are produced on the logs when changes occur in the diameter of the well. Even in the case of a bore hole of uniform diameter, i.e., with a constant amount of fluid between the earth formation and logging instrument there is ordinarily a detrimental effect on the neutron log due to the presence of the fluid. For example, the hydrogen of the well fluid causes rapid slowing down of the fast neutrons from the source, thus raising the slow neutron flux at the detector. At the same time, the hydrogen of the well fluid causes the absorption of the slowed-down neutrons with the subsequent emission of characteristic capture "gamma rays." Thus, in the case of the neutron-neutron log where the slow neutron flux is the quantity measured or in the case of the neutron-gamma log where the quantity measured is the gamma flux, it will be seen that the kind of well fluid, diameter of the bore and separation of source and detector all effect the observed quantity. The magnitude of these adverse effects on the neutron log is often as great or greater than the effect due to the formation characteristics under study.

Various suggestions have been made in the past for minimizing the adverse effect upon a neutron log due to fluid in the bore hole. For example, it has been proposed to displace the bore hole fluids by means of a non-hydrogenous material. A method and apparatus involving this technique is set forth, for example, in U.S. Patent 2,652,496, issued September 15, 1953, to Gerhard Herzog et al. Another patent concerned with displacement of the hydrogen-containing fluid of a bore hole is U.S. Patent 2,509,908, issued May 30, 1950, to K. C. Crumrine. Both of these patents are concerned with proposals for eliminating adverse effects for bore hole fluid by displacement thereof with a non-hydrogenous, i.e., neutron-permeable, material.

Although the aforementioned techniques for minimizing the effects of bore hole fluid on a neutron log are of value, nevertheless, it is considered desirable in many instances to provide means for further inhibiting the effects on the neutron log of slow neutrons or thermal neutrons produced in the bore hole fluid by the source.

It is a general object of the invention to provide improvements in well logging employing a neutron source in the presence of a hydrogenous well fluid.

It is still another object of the invention to provide improved means for directing a neutron source into an earth formation.

It is another object of the invention to provide improved means for overcoming the adverse effects of hydrogenous well fluid in well logging involving the use of a neutron source.

It is a further object of the invention to provide means for enhancing the effectiveness of the neutron source in neutron well logging.

Briefly stated, in accordance with one aspect of the present invention, there is provided a well logging device comprising an elongated instrument housing adapted to be lowered and raised through a well bore and which includes a radiation detector and a source of neutrons spaced from one another along the vertical axis of the housing. Means are provided for directing neutrons toward one side of the well bore, comprising means for shielding the source on the opposite side thereof. Resilient means are further provided for continuously urging the source toward the side of the well bore toward which the neutrons are directed. In accordance with a general aspect of the invention, the neutron shield constitutes means for thermalizing fast neutrons from the source and for capturing the thermalized neutrons to prevent their emission into the well fluid. In accordance with a preferred aspect of the invention, the neutron shield comprises means for thermalizing and backscattering neutrons emitted by the source and for capturing thermal neutrons which may otherwise pass outwardly therefrom toward the well fluid.

For additional objects and advantages and for a better understanding of the invention, attention is now directed to the following description and accompanying drawings. The features of the invention which are believed to be novel are particularly pointed out in the appended claims.

Referring to the drawing;

FIGURE 1 is a vertical sectional elevation through a plurality of earth formations traversed by a bore hole containing a hydrogenous bore hole fluid within which there is suspended a neutron logging instrument;

FIGURE 2 is a cross-sectional view of a portion of a well logging instrument taken through the lines 2—2 of FIGURE 1; and FIGURE 3 is a cross-sectional view similar to that of FIGURE 2 but showing still another modification of the logging instrument of FIGURE 1.

Referring now to FIGURE 1, there is shown a bore hole 10 containing the usual hydrogenous bore hole fluid 11 and which traverses a series of earth formations 12, 13, 14 and 15 about which logging information may be desired. Within the bore hole 10 there is shown a logging instrument or housing 16 suspended therein as by means of a cable 17 which may also provide means for electrically coupling the instrument 16 to electrical apparatus at the surface. For example, the cable 17 may electrically couple the instrument 16 to a suitable amplifier 18, which, in turn, may be coupled to a recorder 19, as shown. A measuring device 20 is illustrated diagrammatically and shown in contact with the cable 17 for determining the length of the cable lowered into the bore hole 10 at any given time.

The instrument 16 may be formed in accordance with known techniques to withstand the pressures and temperatures encountered within an earth bore. The instrument 16 is provided at its lower end with a suitable neutron source 21 mounted within a neutron shield 22 for directing fast neutrons from the source 21 into the formations and for minimizing the number of neutrons that impinge upon the well fluid 11. The shield 22 is constructed in accordance with the principles of the invention and will be described below in greater detail. The source 21 may be of a conventional type employed in the logging art, such as a radium-beryllium source. Typical neutron sources employed as a source of primary radiation in neutron logging such as the aforementioned radium-beryllium source produce neutrons by bombardment of a suitable target with a source of alpha rays. Sources of this type also generally emit gamma rays along with the desired neutrons. Accordingly, above the source 21, within the housing 16, there is shown a suitable gamma ray shield 24 which may be formed of appropriate material such as lead. Within the upper end of the housing 16, remote from the source 21, there is shown a radiation detector 25 which may appropriately be a proportional counter such as that referred to in the aforementioned patent to Gerhard Herzog et al., or which alternately may comprise other known types of detectors suitable for the detection of desired neutrons and/or gamma radiation, as determined by the specific type of log being made. The output of the detector 25 may be coupled to suitable circuitry, such as the preamplifier 26, for enhancing the output thereof for transmission of the logging signal to the surface instruments 18, 19, as by means of the cable 17.

The housing 16 is provided with resilient means for urging one side thereof against one side of the bore hole 10 as the instrument 16 is moved through the well bore. This may be accomplished, as illustrated in FIGURE 1, by the provision of a resilient pressure bar 27 affixed to the upper and lower ends of the instrument 16 and being of bowed configuration such that it is adapted to contact the well bore in a region generally opposite the center of the instrument.

The neutron shield 22 generally surrounds the source 21, except for a collimating aperture 30 for directing neutrons emmitted thereby selectively toward the side of the formation against which the instrument 16 is maintained by the pressure member 27. The shield 22 is comprised of a first or inner shield member 31 formed of material that is capable of effective thermalizing fast neutrons. The first member 31 is, in turn, generally enclosed or surrounded by a second or outer member 32, except for the side thereof toward which the collimating aperture 30 is direct. The second member 32 is characterized in that it is capable of capturing thermalized neutrons.

In accordance with a preferred mode of carrying out the invention, the first section 31 of the shield 22 is formed of material having the ability to backscatter, i.e., reflect fast neutrons toward the formation, as well as being able to thermalize a significant portion of the neutrons that are not backscatter by it. The thermal neutrons thus produced in the first member 31 are then subject to capture by the second member 32 of the neutron shield 22. Preferably, the first member 31 comprises deuterium oxide, generally known as heavy water, maintained within a suitable container or tank 31'. Deuterium oxide has the desired property of being able to reflect and/or thermalize fast neutrons impinging thereon. In addition to embodying the aforementioned desired characteristics to a high degree, deuterium oxide may be readily maintained in a desired configuration by means of an appropriate container due to the fact that it is readily maintained in the liquid phase under logging conditions. The second or outer portion 32 of the neutron shield 22 is formed of material having a comparatively high capture cross-section for thermal neutrons. Preferably, the outer portion 32 of the shield should be formed of boron or a boron compound. In a general sense, however, other thermal neutron-capturing material may be used, such as cadmium and the like.

As illustrated in FIGURE 2, the collimating recess 30 of the neutron shield 22 may appropriately be of generally fan-shaped configuration and preferably subtends a comparatively small number of radians in order that the effective fast neutron output of the source 21 may be directed substantially entirely into the formation against which the instrument 16 is pressed or urged by the resilient member 27. By thus directing the fast neutrons into the formation, the likelihood of thermalization of the neutron beam by the well fluid 11 is minimized. Thus, the secondary radiation observed by the detector 25 is a more effective indication of reactions that have occurred in the formation(s) due to bombardment by the fast neutrons from the source 21.

Referring now to FIGURE 3, there is shown a further embodiment employing certain principles of the invention. In this embodiment, the shield 22' may be formed of the same general configuration as that shown in FIGURE 2. The collimating aperture 30 of the shield illustrated in FIGURE 3 may be generally like that of FIGURE 2. However, instead of two separate sections, the shield 22' is formed of a generally uniform composition of materials capable of thermalizing and capturing fast neutrons impinging thereon from the source 21. Preferably, the material of the shield in this embodiment comprises both boron and hydrogen. Solid ammonium borate is particularly effective as the shielding material. Ammonium borate ($NH_4.H.B_4O_7.3H_2O$) has a density of about 2.6, and contains about 11% more hydrogen in one liter than water. This material will thermalize fast neutrons at a rate which exceeds that of pure water, and is several times the rate of thermalization in earth formations, or drilling fluids. However, this compound contains enough boron to capture the thermal neutrons 850 times as fast as its own hydrogen.

By the use of such a shield, a large fraction of the neutrons which would otherwise enter the drilling fluid and cause unwanted counts in the detector are eliminated in a harmless way. They are rapidly thermalized by the hydrogen and rapidly caught by the boron. The capture by the boron results in the production of an alpha particle which cannot escape to the detector. Although weak, i.e., soft gamma rays, are produced, they may be readily shielded from the detector by means of a conventional source to counter shield such as the gamma ray shield 24, as shown in FIGURE 1. It will thus be apparent that this embodiment of the invention affords an improved contrast in the logging signal.

Additional stable materials suitable for the shielding material and containing both boron and hydrogen are as follows:

| Boron-Hydrogen Material: | Phase |
|---|---|
| $NaH_4B$ | Solid |
| $Na_2B_4O_7 \cdot 10H_2O$ | Solid |
| $B_2H_6 \cdot 2NH_3$ | Solid |
| $B_5H_9 \cdot 4NH_3$ | Solid |
| $B(C_2H_5)_3$ | Liquid |
| $B(C_3H_7)_3$ | Liquid |
| Any stable boron hydride | Solid or liquid |

As illustrated in FIGURE 1, the collimating aperture 30 of the various embodiments of the invention may advantageously be formed with a generally horizontal lower boundary and generally tapered upper boundary, such that the aperture 30 widens as it proceeds outwardly from the source 21 in such manner as to direct neutrons outwardly and somewhat upwardly, whereby the fast neutrons may be directed into the formations at such a location that interactions produced therein may readily be observed by the detector 25.

In accordance with a still further aspect of the invention, it is contemplated that the outer shielding member 32 of the shield 22 as shown in FIGURES 1 and 2 may comprise a substantially uniform composition of boron and hydrogen, such as those materials specified for use as the shielding material in the embodiment of the invention illustrated in FIGURE 3. Preferably, in accordance with this further aspect of the invention, the outer shielding member 32 should be formed of ammonium borate.

As will be appreciated by those skilled in the art, the improved neutron shield construction set forth in the preceding paragraph affords the advantage of providing a neutron shield wherein the inner shielding member 31 is effective in both reflecting and thermalizing neutrons and wherein the outer shielding member 32 is effective in both thermalizing neutrons and capturing thermal neutrons. This combination of shielding materials provides a novel and effective neutron shield for use in neutron logging, as discussed above.

This application is a continuation of our application Serial No. 594,583, filed June 28, 1956 and now abandoned.

While specific embodiments have been shown and described, it will be understood that various modifications may be made without departing from the principles of the invention. The appended claims are, therefore, intended to cover any modifications within the true spirit and scope of the invention.

We claim:

1. A device for logging a bore hole traversing subsurface earth formations and containing a hydrogenous well fluid comprising an instrument housing adapted to be passed through the bore hole, means for supporting said housing in the bore hole, a source of neutrons and a detector of secondary radiations positioned in spaced relation along the longitudinal axis of the instrument, resilient means for continuously urging the housing toward one side of the well bore and means for directing neutrons outwardly from the source toward the formations on said side of the well bore, said directing means comprising a neutron shield generally enclosing said source and having a collimating aperture facing said one side, said shield including an inner shielding member comprising deuterium oxide characterized as both a moderator and reflector of neutrons whereby said inner shielding member is adapted and arranged to thermalize and reflect neutrons toward said one side and an outer shielding member comprising boron and hydrogen in substantially uniform distribution generally enclosing the side of said inner member remote from said aperture, said outer member being characterized as both a moderator and absorber of neutrons whereby said outer member is adapted and arranged to thermalize neutrons and to capture thermal neutrons, whereby neutrons are directed outwardly from the source into the formation to the substantial exclusion of the well fluid.

2. A device as in claim 1 wherein the material of said outer shielding member comprises ammonium borate.

3. A device for logging a bore hole traversing subsurface earth formations and containing a hydrogenous well fluid comprising an instrument housing adapted to be passed through the bore hole, means for supporting said housing in the bore hole, a source of neutrons and a detector of secondary radiations positioned in spaced relation along the longitudinal axis of the instrument, resilient means for continuously urging the housing toward one side of the well bore and means for directing neutrons outwardly from the source toward the formations on said side of the well bore, said directing means comprising a neutron shield generally enclosing said source and having a collimating aperture facing said one side, said shield including an inner shielding member characterized as both a moderator and reflector of neutrons having significant reflective properties for neutrons and a low absorption cross-section for neutrons whereby said inner shielding member is adapted and arranged to thermalize and reflect neutrons toward said one side and an outer shielding member generally enclosing the side of said inner member remote from said aperture, said outer member being characterized as both a moderator and absorber of neutrons whereby said outer member is adapted and arranged to thermalize neutrons and to capture thermal neutrons, whereby neutrons are directed outwardly from the source into the formation to the substantial exclusion of the well fluid.

4. A device as in claim 3 wherein the material of said outer shielding member comprises ammonium borate.

5. A device as in claim 3 wherein said outer shielding member comprises boron and hydrogen in substantially uniform distribution.

References Cited in the file of this patent

UNITED STATES PATENTS 2,769,918    Tittle _____ Nov. 6, 1956

OTHER REFERENCES

Fermi: U.S.A.E.C. Report NP 2385 (1951). Translation of Ric. Scient. VII-2, 13-1936.